United States Patent
Yang et al.

(10) Patent No.: US 9,566,667 B2
(45) Date of Patent: Feb. 14, 2017

(54) CUTTING METHOD OF FLEXIBLE DISPLAY PANEL, CONTROLLING DEVICE IN THE CUTTING METHOD, AND CUTTING APPARATUS OF FLEXIBLE DISPLAY PANEL

(71) Applicant: BOE TECHNOLOGY GROUP CO., LTD., Beijing (CN)

(72) Inventors: Jing Yang, Beijing (CN); Lu Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 130 days.

(21) Appl. No.: 14/436,954

(22) PCT Filed: Nov. 21, 2014

(86) PCT No.: PCT/CN2014/091869
§ 371 (c)(1),
(2) Date: Apr. 20, 2015

(87) PCT Pub. No.: WO2015/165256
PCT Pub. Date: Nov. 5, 2015

(65) Prior Publication Data
US 2016/0175987 A1   Jun. 23, 2016

(30) Foreign Application Priority Data
Apr. 29, 2014 (CN) .......................... 2014 1 0177998

(51) Int. Cl.
*B23K 26/38* (2014.01)
*B23K 26/00* (2014.01)
(Continued)

(52) U.S. Cl.
CPC ........... *B23K 26/38* (2013.01); *B23K 26/0093* (2013.01); *B29C 59/16* (2013.01); *C03B 33/0222* (2013.01);
(Continued)

(58) Field of Classification Search
CPC ...... B23K 26/0093; B23K 26/38; B29C 59/16
See application file for complete search history.

(56) References Cited

U.S. PATENT DOCUMENTS

| 6,910,403 B1 | 6/2005 | Ishikawa et al. |
| 8,349,194 B2 | 1/2013 | Paek et al. |

(Continued)

FOREIGN PATENT DOCUMENTS

| CN | 1885109 A | 12/2006 |
| CN | 101303504 A | 11/2008 |

(Continued)

OTHER PUBLICATIONS

Chinese Office Action of Chinese Application No. 201410177998.2, mailed May 22, 2015 with English translation.
(Continued)

*Primary Examiner* — James Sanders
(74) *Attorney, Agent, or Firm* — Collard & Roe, P.C.

(57) ABSTRACT

Disclosed are a cutting method of flexible display panel, a controlling device in the cutting method and a cutting apparatus of flexible display panel. The cutting method comprises steps of placing a transparent substrate (21) carried with a flexible film layer (22) on a base (10); cutting only the transparent substrate (21) by means of a cutting tool (30); obtaining a cutting trace of the cutting tool (30); and controlling a laser knife (40) to cut the flexible film layer (22) carried on the transparent substrate (21) along the cutting trace of the cutting tool cutting the transparent substrate. In this way, by controlling the laser knife (40) to cut the flexible film layer (22) disposed on the transparent substrate (21) following the cutting trace of the cutting tool (30) cutting the transparent substrate (21), the flexible film layer (22) can be completely cut at the same time when or after the transparent substrate (21) is completely cut, so as to avoid rough selvedges during cutting the flexible film (Continued)

layer (22), thereby improving the cutting effect of cutting the flexible display panel; besides, in case that the cutting tool (30) and the laser knife (40) operate in parallel cutting mode, it can also improve the cutting efficiency.

20 Claims, 2 Drawing Sheets

(51) Int. Cl.
*B29C 59/16* (2006.01)
*C03B 33/02* (2006.01)
*C03B 33/07* (2006.01)
*B29L 31/00* (2006.01)
*C03B 33/037* (2006.01)

(52) U.S. Cl.
CPC ....... *C03B 33/074* (2013.01); *B23K 2203/172* (2015.10); *B29L 2031/723* (2013.01); *C03B 33/037* (2013.01)

(56) References Cited

U.S. PATENT DOCUMENTS

| | | | |
|---|---|---|---|
| 8,593,612 | B2 | 11/2013 | Lee et al. |
| 8,736,162 | B2 | 5/2014 | Jin et al. |
| 8,922,505 | B2 | 12/2014 | Kang et al. |
| 2010/0116800 | A1 | 5/2010 | Nishida et al. |

FOREIGN PATENT DOCUMENTS

| | | | | |
|---|---|---|---|---|
| CN | 101406989 | A | | 4/2009 |
| CN | 101505909 | A | | 8/2009 |
| CN | 101624259 | A | | 1/2010 |
| CN | 102566810 | A | | 7/2012 |
| CN | 102749748 | A | | 10/2012 |
| CN | 102855821 | A | | 1/2013 |
| CN | 202658076 | U | * | 1/2013 ............ C03B 33/02 |
| CN | 103064209 | A | | 4/2013 |
| CN | 103286809 | A | | 9/2013 |
| CN | 103962730 | A | | 8/2014 |
| JP | 2006080465 | A | | 3/2006 |
| JP | 4987266 | B2 | | 7/2012 |
| JP | 2013-10658 | A | | 1/2013 |

OTHER PUBLICATIONS

International Search Report of the International Searching Authority for PCT/CN2014/091869 with Notice of Transmittal of the International Search Report mailed Feb. 15, 2015 in Chinese.

Written Opinion of the International Searching Authority for PCT/CN2014/091869 mailed Feb. 15, 2015 in Chinese with an English translation.

\* cited by examiner

CUTTING METHOD OF FLEXIBLE DISPLAY PANEL, CONTROLLING DEVICE IN THE CUTTING METHOD, AND CUTTING APPARATUS OF FLEXIBLE DISPLAY PANEL

CROSS REFERENCE TO RELATED APPLICATIONS

This application is the National Stage of PCT/CN2014/091869 filed on Nov. 21, 2014, which claims priority under 35 U.S.C. §119 of Chinese Application No. 201410177998.2 filed on Apr. 29, 2014, the disclosure of which is incorporated by reference.

TECHNICAL FILED

Embodiments of the present invention relate to a cutting method of flexible display panel, a controlling device in the cutting method, and a cutting apparatus of flexible display panel.

BACKGROUND

Flat plate display has dominated the field of display in the $21^{st}$ century. With the development of technology, flexible products are generating more and more attention and praise from customers for advantages such as reduced thickness and weight, high stability, flexibility, manufacturability in various forms and energy conservation, and hence have become a hot spot of recent research. A flexible display panel is usually prepared by steps including using a glass substrate configured to carry the flexible display panel and a flexible film layer disposed on the glass substrate.

Generally, there is need to cut an entire flexible display panel into pieces of smaller-sized ones, at first, during a manufacture process of the flexible display panel. One of known cutting methods comprises: cutting a glass substrate configured to carry a flexible display panel by means of a cutting tool; and then cutting a flexible film layer by hand with a knife. In such cutting method, it's liable to generate rough selvedges during manually cutting the flexible film layer, which may influence the quality of the flexible display panel obtained; moreover, a manual cutting process is usually performed at a relatively lower speed, which also influences the cutting efficiency of the flexible display panel.

SUMMARY

At least one embodiment of the present invention provides a cutting method of flexible display panel, a controlling device in the cutting method, and a cutting apparatus of flexible display panel; which are able to improve the cutting effect and cutting efficiency of the flexible display panel.

The cutting method of flexible display panel as provided by embodiments of the present invention comprises steps of placing a transparent substrate carried with a flexible film layer on a base; cutting only the transparent substrate by means of a cutting tool; obtaining a cutting trace of the cutting tool; controlling a laser knife to cut the flexible film layer carried on the transparent substrate along the cutting trace of the cutting tool.

In an example, the step of placing a transparent substrate carried with a flexible film layer on a base comprises: allowing one side of the transparent substrate carrying the flexible film layer to face towards the base while allowing the other side of the transparent substrate to face away from the base.

In an example, the step of cutting only the transparent substrate by means of a cutting tool comprises: cutting the transparent substrate by aligning the cutting tool with a cutting mark pre-arranged on the transparent substrate.

In an example, the step of obtaining a cutting trace of the cutting tool comprises: detecting projective positions of the cutting tool on a plane of the flexible film layer.

In an example, the step of controlling a laser knife to cut the flexible film layer carried on the transparent substrate along the cutting trace of the cutting tool comprises: receiving a projective position of the cutting tool on the plane of the flexible film layer in real time and meanwhile controlling the laser knife to move with the projective position according to a signal in connection with the projective position.

In an example, the step of controlling a laser knife to cut the flexible film layer carried on the transparent substrate along the cutting trace of the cutting tool comprises: receiving different projective positions of the cutting tool on the plane of the flexible film layer; and when the cutting tool finishes cutting the transparent substrate, controlling the laser knife to move according to a trace generated from the different projective positions.

In an example, the cutting tool and the laser knife are located at two sides of the base, respectively.

In an example, the cutting tool and the laser knife are located at the same side or different sides of the base.

Embodiments of the present invention further provide a controlling device in the cutting method of flexible display panel, the controlling device comprises a receiving module configured to receive a cutting trace of a cutting tool cutting a transparent substrate; and a data processing module connected to the receiving module through signal and configured to control a laser knife to cut a flexible film layer carried on the transparent substrate along the cutting trace of the cutting tool.

Embodiments of the present invention further provide a cutting apparatus of flexible display panel comprising: a base configured to carry a transparent substrate carried with a flexible film layer; a cutting tool configured to cut only the transparent substrate; a sensor configured to detect a cutting trace of the cutting tool; a laser knife configured to cut the flexible film layer carried on the transparent substrate according to the cutting trace of the cutting tool; an actuating device configured to actuate the laser knife; and a controlling device connected to the sensor and the actuating device through signal and configured to control the laser knife to cut the flexible film layer along the cutting trace of the cutting tool.

In an example, the base is a transparent base.

In an example, the transparent base is a quartz base.

In an example, the transparent substrate is a glass substrate, a quartz substrate or a sapphire substrate.

In an example, the cutting tool is located at one side of the base while the laser knife is located at the other side of the base; and the sensor is disposed on the laser knife.

In an example, the cutting tool and the laser knife are located at the same side of the base, and the sensor is disposed on the laser knife.

BRIEF DESCRIPTION OF THE DRAWINGS

Embodiments of the present invention will be described in more detail below with reference to the accompanying drawings to enable those skilled in the art to understand the present invention more clearly, wherein.

REFERENCE NUMERALS

Figure 1:
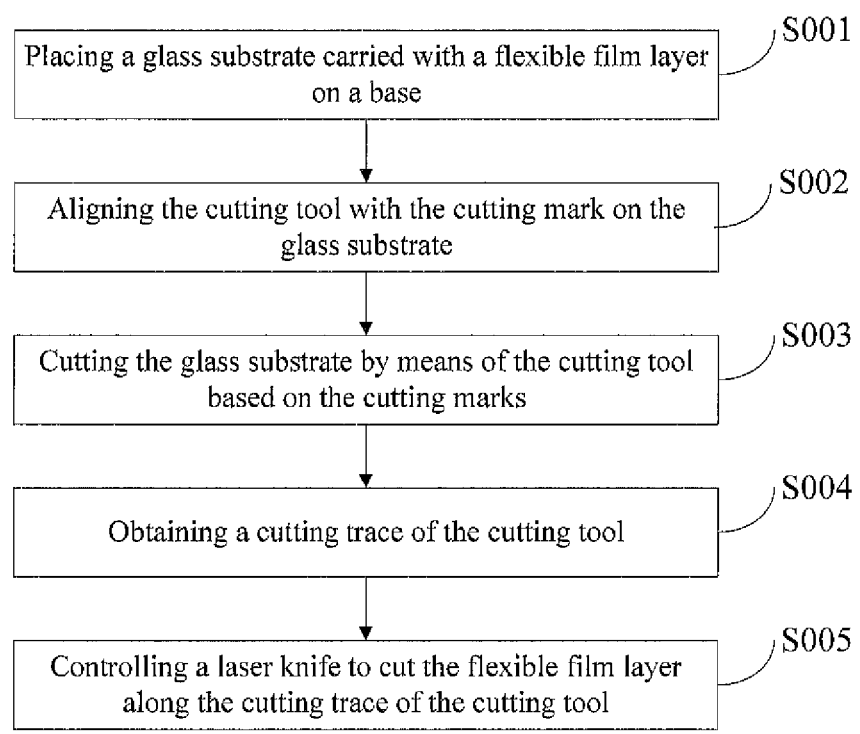
FIG. 1 is a flow chart illustrating a cutting method of flexible display panel as provided by embodiments of the present invention.

10—base; 20—flexible display panel; 21—transparent substrate; 22—flexible film layer; 30—cutting tool; 40—laser knife; 50—sensor; 60—actuating device; 70—controlling device

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

At least one embodiment of the present invention provides a cutting method of flexible display panel, a controlling device in the cutting method, and a cutting apparatus of flexible display panel, which are able to improve the cutting effect and cutting efficiency of the flexible display panel.

According to the technical solution as provided by at least one embodiment of the present invention, a flexible film layer is cut by controlling a laser knife so as to improve the cutting effect and cutting efficiency of the flexible display panel.

Embodiments of the present invention provide a cutting method of flexible display panel, comprising steps as below: placing a transparent substrate carried with a flexible film layer on a base; cutting only the transparent substrate by means of a cutting tool; obtaining a cutting trace of the cutting tool; controlling a laser knife to cut the flexible film layer carried on the transparent substrate along the cutting trace of the cutting tool.

In the method above, by controlling the laser knife to cut the flexible film layer disposed on the transparent substrate following the cutting trace of the cutting tool cutting the transparent substrate, the flexible film layer can be completely cut at the same time when or after the transparent substrate is completely cut, so as to avoid rough selvedges during cutting the flexible film layer, thereby improving the cutting effect of cutting the flexible display panel; besides, in case that the cutting tool and the laser knife operate in parallel cutting mode, it can also improve the cutting efficiency.

FIG. 1 illustrates a cutting method of flexible display panel according to an embodiment of the present invention. As shown in FIG. 1, a glass substrate serves as the transparent substrate by way of example, and the cutting method comprises steps as below.

S001, placing a glass substrate carried with a flexible film layer on a base.

For example, the transparent substrate can be placed upside down in such a manner that one side thereof carrying the flexible film layer is facing towards the base while the other side is facing away from the base.

Wherein, the glass substrate is pre-arranged with cutting marks thereon. The cutting marks on the glass substrate can be formed, for example, during an Array process and can be identified by an apparatus of cutting the glass substrate, which is well-known in the related art and thus is omitted with details thereof herein.

Step 002, aligning the cutting tool with the cutting mark on the glass substrate.

In this way, it is convenient for the cutting tool to operate and also ensures that the flexible display panel as obtained by cutting process satisfies the cutting requirements. For example, the cutting tool can search for cutting marks pre-arranged on the glass substrate and align with the cutting marks automatically, which is well-known in the related art and thus is omitted with details thereof herein.

Step 003, cutting the glass substrate by means of the cutting tool based on the cutting marks.

Step 004, obtaining a cutting trace of the cutting tool.

For example, this step can be performed by detecting projective positions of the cutting tool on a plane of the flexible film layer by means of a sensor; in this way, the position of the cutting tool and hence the cutting trace of the cutting tool can be obtained precisely. The sensor can be disposed on the laser knife, for example.

Step 005, controlling a laser knife to cut the flexible film layer along the cutting trace of the cutting tool.

In this step, the laser knife can operate in two different cutting modes. In one example, the laser knife and the cutting tool are operating in parallel cutting mode; in another example, the laser knife and the cutting tool are operating in successive cutting mode.

In the successive cutting mode, for example, after the cutting tool finishes cutting the glass substrate, the controlling device (described later) finally determines a cutting trace of the cutting tool according to different positions of the cutting tool as detected during the cutting tool cutting the glass substrate; and then the controlling device controls the laser knife to cut the flexible film layer along the cutting trace of the cutting tool, so as to complete cutting the flexible display panel. In such mode, the cutting tool and the laser knife can be located at the same side or different sides of the base.

In the parallel cutting mode, for example, the controlling device generates a signal according to a projective position of the cutting tool on a plane of the flexible film layer as received in real time during the cutting tool is cutting the glass substrate, to control the laser knife to move with the projective position, and hence to move with the cutting tool. In such mode, the cutting tool and the laser knife are located at different sides of the base. The parallel cutting mode improves the cutting efficiency of the flexible display panel.

As it can be seen from the exemplary operating steps in above embodiments, the laser knife is controlled to cut a flexible film layer carried on a glass substrate according to a cutting trace of a cutting tool cutting the glass substrate, so as to avoid rough selvedges during cutting the flexible film layer, thereby improving the cutting effect of cutting the flexible display panel. In case that the cutting tool and the laser knife operate in parallel cutting mode, it also can improve the cutting efficiency.

Although the above embodiments are described with glass substrate by way of example, those skilled in the art should understand that these embodiments are also applicable for transparent substrates in other forms and thus the details thereof are omitted herein.

Providing that a glass substrate serves as the transparent substrate by way of example, the cutting apparatus of flexible display panel as provided by an embodiment of the present invention comprises: a receiving module configured to receive a cutting trace of a cutting tool cutting a glass substrate; and a data processing module connected to the receiving module through signal and configured to control a laser knife to cut a flexible film layer carried on the glass substrate along the cutting trace of the cutting tool cutting the glass substrate.

Those skilled in the art should understand that the controlling device as provided by embodiments of the present invention can be implemented with software incorporated into necessary general-purpose hardware, or implemented with dedicated hardware, of course, although in most cases the former form is selected as the preferred one. Based on the concept above, the controlling device as provided by embodiments of the present invention is implemented, substantively, with software, hardware, firmware or any combination thereof. Computer software products can be stored in, for example, readable storage mediums such as magnetic storage medium (e.g., hard disk) or electronic storage medium (e.g., ROM and flash disk) carrying with several instructions which, when executed, allow a computing device (a computer, a server or a network device) to achieve functions of the receiving module and the data processing module in the controlling device as provided by embodiments of the present invention.

One example of controlling the laser knife by the controlling device as provided by the above embodiments comprises: receiving a signal indicating projective positions of the cutting tool on a plane of the flexible film layer, through the receiving module; and generating and transmitting another signal controlling the laser knife to move with the projective positions, according to the signal indicating the projective positions of the cutting tool, through the data processing module.

For example, in order to facilitate obtaining the signal indicating projective positions of the cutting tool, a coordinate system with the plane of the flexible film layer as a reference plane is established to detect positions of the cutting tool.

Hereafter, in the parallel cutting mode described above, the data processing module identifies a coordinate of the cutting tool according to the position as detected, in real time, and generates and transmits a signal controlling the laser knife, according to the coordinate of position of the cutting tool, so as to allow the laser knife to arrive at the same coordinate; in this way, the laser knife follows a cutting trace of the cutting tool to finish cutting the flexible display panel.

As a contrast, in the successive cutting mode described above, after the cutting tool finishes cutting the glass substrate, the data processing module finally determines a cutting trace of the cutting tool according to different positions of the cutting tool as detected during the cutting tool cutting the glass substrate and then controls the laser knife to cut the flexible film layer along the cutting trace of the cutting tool cutting the glass substrate, so as to finish cutting the flexible display panel.

Although embodiments above are described with glass substrate by way of example, those skilled in the art should understand that these embodiments are applicable for transparent substrates in other forms and details thereof thus are omitted herein.

Figure 2:
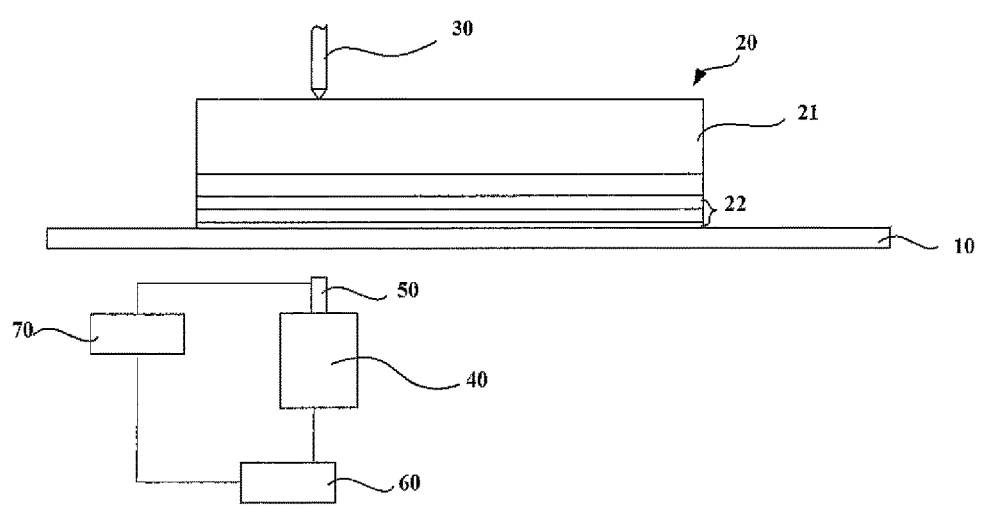
FIG. 2 is a schematic diagram illustrating a structure of a cutting apparatus of flexible display panel as provided by embodiments of the present invention.

FIG. 2 illustrates a structure of a cutting apparatus of flexible display panel as provided by an embodiment of the present invention. As shown in FIG. 2, the cutting apparatus comprises a base 10 configured to carry a transparent substrate 21 and a flexible film layer 22, wherein the transparent substrate 21 carries the flexible film layer 22 and also a flexible display panel 20 as obtained after finishing cutting; a cutting tool 30 configured to cut the transparent substrate 21; a sensor 50 configured to detect a cutting trace of the cutting tool 30 cutting the transparent substrate 21; a laser knife 40 configured to cut the flexible film layer 22 carried on the transparent substrate 21; an actuating device 60 configured to actuate the laser knife 40; and a controlling device 70 connected to the sensor 50 and the actuating device 60 through signal and configured to control the laser knife 40 to cut the flexible film layer 22 carried on the transparent substrate 21 along the cutting trace of the cutting tool 30 cutting the transparent substrate 21.

For example, the base 10 can be a transparent substrate such as a quartz substrate so as to facilitate locating the laser knife 40 and the cutting tool 30 at different positions.

For example, the transparent substrate 21 can be made of transparent materials such as glass, quartz and sapphire, without limiting the present invention thereto. It's necessary for the transparent substrate to have relatively higher thermal stability and relatively higher intensity so as to carry and support the flexible display panel formed thereon.

For example, the actuating device 60 can be any actuating device well-known in the related art such as stepper motor, without limiting the present invention thereto.

For example, the controlling device 70 can be any controlling device described in the embodiments above, without limiting the present invention thereto.

For example, the cutting tool 30 can be located above the flexible film layer 22 or above the transparent substrate 21, while the laser knife 40 is located below the flexible film layer 22 or below the transparent substrate 21; and the sensor 50 is disposed on the laser knife 40. It detects the positions of the cutting tool 30 in real time by the sensor 50 and controls the laser knife 40 to move with the cutting tool 30 by the controlling device 70, so as to improve the cutting efficiency.

During the use of the cutting apparatus of flexible display panel as provided by the above embodiments, the flexible film layer 22 carried on the glass substrate 21 is cut by a laser knife 40 under a control of the controlling device 70 according to the cutting trace of the cutting tool 30 cutting the glass substrate 21, so as to avoid rough selvedges during cutting the flexible film layer 22, thereby improving the cutting effect of cutting the flexible display panel 20; in case that the cutting tool 30 and the laser knife 40 operate in parallel cutting mode, it also can considerably improve the cutting efficiency.

Regarding other operations and features of the cutting apparatus of flexible display panel as provided by embodiments of the present invention, references can be made to the cutting method of flexible display panel and the controlling device in the cutting method as previously described, and details thereof thus can be omitted herein.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

The present application claims the priority of China patent application No. 201410177998.2 filed on Apr. 29, 2014, titled "CUTTING METHOD AND CUTTING APPARATUS OF FLEXIBLE DISPLAY PANEL, AND CONTROLLING DEVICE", which is incorporated herein by reference in its entirely.

What is claimed is:

1. A cutting method of flexible display panel, comprising steps of:
   placing a transparent substrate carried with a flexible film layer on a base;
   cutting only the transparent substrate by means of a cutting tool;
   obtaining a cutting trace of the cutting tool; and
   controlling a laser knife to cut the flexible film layer carried on the transparent substrate along the cutting trace of the cutting tool.

2. The cutting method of flexible display panel of claim 1, wherein the step of placing a transparent substrate carried with a flexible film layer on a base comprises:
   allowing one side of the transparent substrate carrying the flexible film layer to face towards the base while allowing the other side of the transparent substrate to face away from the base.

3. The cutting method of flexible display panel of claim 1, wherein the step of cutting only the transparent substrate by means of a cutting tool comprises:
   cutting the transparent substrate by aligning the cutting tool with a cutting mark pre-arranged on the transparent substrate.

4. The cutting method of flexible display panel of claim 1, wherein the step of obtaining a cutting trace of the cutting tool comprises:
   detecting a projective position of the cutting tool on a plane of the flexible film layer.

5. The cutting method of flexible display panel of claim 1, wherein the step of controlling a laser knife to cut the flexible film layer carried on the transparent substrate along the cutting trace of the cutting tool comprises:
   receiving the projective position of the cutting tool on the plane of the flexible film layer in real time and meanwhile controlling the laser knife to move with the projective position according to a signal in connection with the projective position.

6. The cutting method of flexible display panel of claim 1, wherein the step of controlling a laser knife to cut the flexible film layer carried on the transparent substrate along the cutting trace of the cutting tool comprises:
   receiving different projective positions of the cutting tool on the plane of the flexible film layer; and
   when the cutting tool finishes cutting the transparent substrate, controlling the laser knife to move according to a trace generated from the different projective positions.

7. The cutting method of flexible display panel of claim 5, wherein the cutting tool and the laser knife are located at two sides of the base, respectively.

8. The cutting method of flexible display panel of claim 6, wherein the cutting tool and the laser knife are located at the same side or different sides of the base.

9. A controlling device in the cutting method of flexible display panel of claim 1, comprising:
   a receiving module configured to receive a cutting trace of a cutting tool cutting a transparent substrate; and
   a data processing module connected to the receiving module through signal and configured to control a laser knife to cut a flexible film layer carried on the transparent substrate along the cutting trace of the cutting tool.

10. A cutting apparatus of flexible display panel, comprising:
   a base configured to carry a transparent substrate carried with a flexible film layer;
   a cutting tool configured to cut only the transparent substrate;
   a sensor configured to detect a cutting trace of the cutting tool;
   a laser knife configured to cut the flexible film layer carried on the transparent substrate according to the cutting trace of the cutting tool;
   an actuating device configured to actuate the laser knife; and
   a controlling device connected to the sensor and the actuating device through signal and configured to control the laser knife to cut the flexible film layer along the cutting trace of the cutting tool.

11. The cutting apparatus of flexible display panel of claim 10, wherein the base is a transparent base.

12. The cutting apparatus of flexible display panel of claim 11, wherein the transparent base is a quartz base.

13. The cutting apparatus of flexible display panel of claim 10, wherein the transparent substrate is a glass substrate, a quartz substrate or a sapphire substrate.

14. The cutting apparatus of flexible display panel of claim 10, wherein the cutting tool is located at one side of the base while the laser knife is located at the other side of the base; and the sensor is disposed on the laser knife.

15. The cutting apparatus of flexible display panel of claim 10, wherein the cutting tool and the laser knife are located at the same side or different sides of the base; and the sensor is disposed on the laser knife.

16. The cutting method of flexible display panel of claim 2, wherein the step of cutting only the transparent substrate by means of a cutting tool comprises:
   cutting the transparent substrate by aligning the cutting tool with a cutting mark pre-arranged on the transparent substrate.

17. The cutting method of flexible display panel of claim 2, wherein the step of obtaining a cutting trace of the cutting tool comprises:
   detecting a projective position of the cutting tool on a plane of the flexible film layer.

18. The cutting method of flexible display panel of claim 3, wherein the step of obtaining a cutting trace of the cutting tool comprises:

detecting a projective position of the cutting tool on a plane of the flexible film layer.

19. The cutting method of flexible display panel of claim 2, wherein the step of controlling a laser knife to cut the flexible film layer carried on the transparent substrate along the cutting trace of the cutting tool comprises:

receiving the projective position of the cutting tool on the plane of the flexible film layer in real time and meanwhile controlling the laser knife to move with the projective position according to a signal in connection with the projective position.

20. The cutting method of flexible display panel of claim 3, wherein the step of controlling a laser knife to cut the flexible film layer carried on the transparent substrate along the cutting trace of the cutting tool comprises:

receiving the projective position of the cutting tool on the plane of the flexible film layer in real time and meanwhile controlling the laser knife to move with the projective position according to a signal in connection with the projective position.

* * * * *